Oct. 3, 1933.                 W. C. SPECK ET AL                 1,929,264
                  APPARATUS FOR BREAKING GATES FROM CASTINGS
                    Original Filed Jan. 14, 1929    2 Sheets-Sheet 1
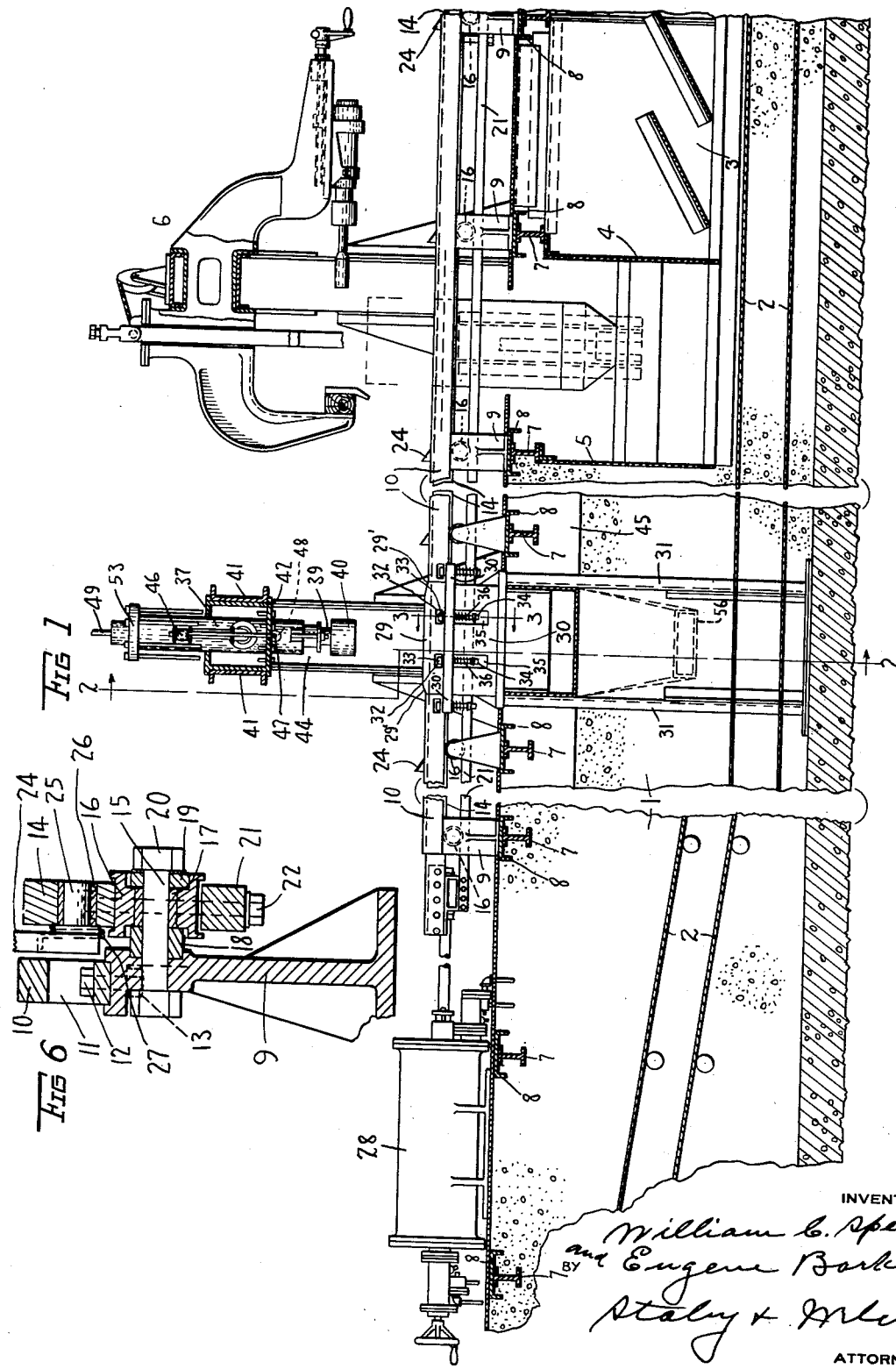
INVENTORS
William C. Speck
and Eugene Barker
BY
Staley & Welch
ATTORNEYS

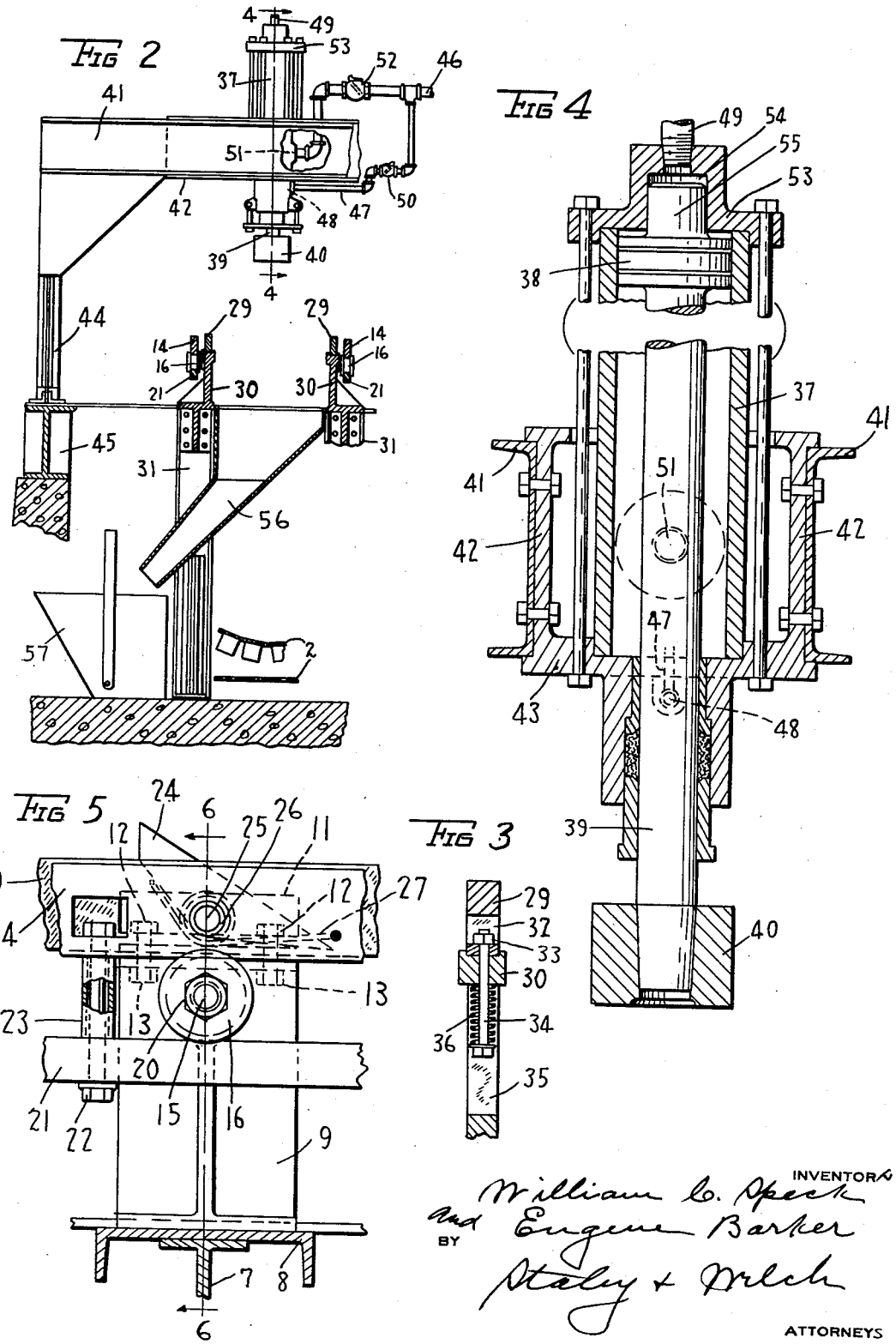

Patented Oct. 3, 1933

1,929,264

UNITED STATES PATENT OFFICE 1,929,264

APPARATUS FOR BREAKING GATES FROM CASTINGS

William C. Speck and Eugene Barker, Columbus, Ohio, assignors to The Buckeye Steel Castings Company, Columbus, Ohio, a corporation of Ohio Original application January 14, 1929, Serial No. 332,344. Divided and this application March 9, 1931. Serial No. 521,212

7 Claims. (Cl. 29—66)

This invention relates to apparatus for breaking the gates from castings, this application being a division of our pending application Serial No. 332,344, filed January 14th, 1929.

One of the objects of this invention is to provide means for economically and effectively breaking the gates from castings.

Other objects of the invention will appear from the accompanying description and claims.

In the accompanying drawings:

Fig. 1 is a longitudinal section of an apparatus embodying the improvements.

Fig. 2 is a section on the line 2—2 of Fig. 1.

Fig. 3 is an enlarged section on the line 3—3 of Fig. 1.

Fig. 4 is an enlarged vertical sectional view of the cylinder shown in Fig. 2, the section being on the line 4—4 of Fig. 2.

Fig. 5 is an enlarged side elevation of a portion of Fig. 1.

Fig. 6 is a section on the line 6—6 of Fig. 5.

Referring to the drawings, 1 represents the walls of a pit which is constructed beyond the floor line preferably of concrete. This pit extends throughout the entire length of the apparatus and has therein an endless conveyor which carries the sand which is knocked from the castings, as well as loose trash, to a suitable point of discharge. The carrier consists of an endless belt 2 which passes about portions not shown in the present case which are more fully described in our application referred to. A sheet metal box is placed in the forward end of the pit, the sides 3 and forward end (not shown) of which slope inwardly and downwardly so as to form in effect a chute leading to the conveyor belt, with the open space between the lower edges thereof immediately above the belt. The rear wall of this box is a vertical wall as indicated at 4 and cooperates with another vertical wall 5 to form a chamber beneath slogging devices which are indicated in a general way by 6, but as these slogging devices are fully described in our pending application referred to and form no part of the present invention, a description of the details thereof will be omitted.

Casting carrier

Supported by the walls of the pit are a series of transversely-arranged I-beams 7 upon which are mounted inverted channel irons 8 which form supports for the various mechanisms to be described. Supported upon the majority of these channel irons at each side of the pit are a series of standards 9. Mounted upon these standards are stationary casting supporting rails 10, the rails being recessed as indicated at 11 to accommodate the nuts 12 of bolts 13 which fasten the rails to the standards. Also supported by the standards adjacent the outer sides of the stationary rails 10 are reciprocating bars 14. To support these bars each standard is provided with a stud 15 which carries a grooved roll 16 which is loosely mounted upon a bushing 17 on the stud between collars 18 and 19 held in place by a nut 20. In order to prevent displacement of the bars 14 there is provided for each bar a keeper bar 21 arranged beneath the studs and cooperating with the rolls to hold the bars 14 to the rolls; these keeper bars 21 being connected to the bars 14 by bolts 22 surrounded by spacing sleeves 23. Carried by the bars 14 are pawls 24, each pawl having a stud 25 journalled in a bushing 26 carried by a rail 14; a spring 27 being coiled about the stud with one end thereof bearing against the pawl and the other end inserted in an opening in the rail 14. These pawls are so disposed that their upper edges are inclined upwardly and rearwardly so that when the bars 14 are reciprocated toward the forward ends of the rails the noses of the pawls will be rocked downwardly by contact with the castings which have been placed upon the rails and when the bars 14 are reciprocated rearwardly these pawls will engage the castings and move the same rearwardly upon the rails. At this point it should be explained that the castings are placed transversely across the rails 10 in suitable spaced-apart relation and are carried in successive order by the reciprocating bars and their pawls to, first, the slogging mechanism, heretofore referred to, then to the gate breaker devices to be described, and then to the point of discharge.

To reciprocate the pawl carrying bars 14 and their connected keeper bars 21 there is provided a fluid pressure cylinder 28, the details of which have been explained in my pending application referred to and which are made the subject matter of an application filed by us March 9, 1931 Serial No. 521,213.

Gate breaker

The mechanism for breaking the gates from the castings is located a suitable distance beyond or to the rear of the slogging mechanism referred to. There is interposed in the stationary rails 10 short rail sections 29 which serve as faces for the anvil. These face members are mounted upon the upper sides of anvil members 30 which are each secured to and supported by a pair of upright channel members 31 which rest upon the bottom of the pit. The face members 29 are preferably secured to the anvil members 30 in the manner best shown in Fig. 3 in which it will be seen that the face members are provided with a pair of recesses 32 to accommodate the nuts 33 of bolts 34. The anvil member 30 is also provided with a pair of recesses 35 to accommodate these bolts and a coil spring 36 is placed about each bolt and interposed between the head thereof and the upper wall of its corresponding recess. The adjacent ends of the rails 10 are also connected to extensions 30' of the anvil member in a similar manner as shown in Fig. 1. By having the anvil faces as well as the ends of the rails 10 thus connected to the anvil member, instead of being bolted rigidly to it, the possibility of the anvil faces and the rail ends becoming loose by constant pounding is eliminated. It will be noticed from Fig. 1 that the upper surfaces of the faces 29 are slightly higher than the tops of the rails 10 and are approached by inclinations 29', this being for the purpose of raising the castings at this point a sufficient distance above the oscillating feeding members as to eliminate the possibility of a fin or bump on the rough casting coming in contact with the reciprocating members at the time the gate on the casting is broken off.

Locate above the anvil is a cylinder 37 having a piston 38, the rod 39 of which is provided with a weighted head 40 secured to its lower end. This cylinder is supported by a pair of horizontal channel irons 41 which are secured to extensions 42 of the lower head 43; these channel members 41 being supported by a pair of vertically arranged I-beams 44, one on each side of the supporting rails, which are set on and secured to short horizontal I-beams 45 embedded in the walls of the pit.

When a gate is to be broken from the casting, the casting is placed on the anvil by the reciprocating feeding devices so as to position the gate beneath the hammer 40. The hammer is first raised by admitting compressed air or other fluid into the lower end of the cylinder from the pipe 46 through the pipe 47 and through the supply port 48 by the operator at a central control station. The piston is then forced downwardly to bring the hammer 40 in contact with the casting gate by admitting air or other fluid under pressure to the inlet 49 from the central control station. As the piston moves downwardly, a check valve 50 closes the pipe 47 and the air exhausts through a comparatively large exhaust port 51 to the pipe 46, which has been opened to atmosphere by the operator at the central control station; this pipe 46 having a check valve 52 which permits the escape of the exhaust but closes when air is admitted to the lower end of the cylinder to raise the piston in the manner before explained. It will be noticed that the exhaust port 51 is located some distance above the lower end of the cylinder, as a result of which, after the piston has passed this port in its downward movement an air cushion will be formed in the lower end of the cylinder to cushion the piston and its connected hammer; the inlet port 48 being closed at this time by the check valve 50. Provision is also made for checking the upward movement of the piston and connected parts and to that end the upper head 53 of the cylinder is shown provided with a reduced chamber 54 into which moves a plunger 55 which is merely an extension of the piston rod 39. As the piston moves upwardly air is exhausted through the port 49 but as soon as the extension of the plunger 55 enters the reduced chamber 54 the exhaust is cut off and the remaining air compressed between the piston and upper cylinder head to form a cushion.

The gates which are broken from the castings fall into a chute 56 which conveys them to a suitable receptacle 57.

*General operation*

This operation is as follows: The castings are placed cross-wise on the stationary rails at the forward or right-hand end of the machine as viewed in the drawings, with an open side down, as many castings being placed thereon as can be accommodated. Assuming that the reciprocating dog bars had been moved to their extreme right-hand position, then each casting will be placed closely adjacent its neighboring right-hand dog. The operator then admits air to the right-hand end of the cylinder 28 which reciprocates the dog bars rearwardly or to the left moving all of the castings in that direction, and then puts air into the left hand end of the cylinder 28 so as to return the dog bars to their original position, the dogs, by reason of their inclination, swinging down as they contact the castings so as to pass the same and immediately thereafter returning to their upright engaging positions. The operator then slogs the casting by the mechanism 6 in the manner described in application Serial No. 332,344, previously refered to, and in due course the casting will be moved upon the anvil 29 with its gates beneath the hammer 40 and by suitably manipulating the piston of the cylinder 37 the hammer 40 will be caused to deliver a blow upon the gate to knock it from the casting, the gate falling through the chute 56 to the receptacle 57.

Having thus described our invention, we claim:

1. In an apparatus of the character described, a carrier for castings which includes a pair of supporting rails and means for sliding the castings on said rails, a pair of anvil members interposed in said rails, a power-operated impact member above said anvil members, and means for resiliently connecting adjacent ends of said rails with said anvil members.

2. In an apparatus of the character described, a carrier for castings including a pair of supporting rails and means for sliding the castings on said rails, a pair of anvil members interposed in said rails, a power-operated impact member above said anvil member, an impact face directly mounted on each anvil member but capable of moving upwardly relatively thereto, and resilient means to resist such upward movement.

3. In an apparatus of the character described, a carrier for castings including a pair of supporting rails and means for sliding the castings on said rails, a pair of anvil members interposed in said rails, a power-operated impact member above said anvil members, an impact face directly mounted on each anvil member but capable of moving upwardly relative thereto, resilient means to resist such upward movement, and means for resiliently connecting the adjacent ends of said rails with said anvil members.

4. In an apparatus of the character described, a pair of parallel spaced-apart track members, oppositely arranged anvil members interposed in said track members with the track members leading in both directions from the anvil members, means for sliding the castings in one direction along and on said track members to deposit the same on said anvil members and to thereafter slide said castings in the same direction on said track members away from said anvil members, and an impact member above said anvil members.

5. In an apparatus of the character described, a stationary supporting track for a plurality of castings, means for sliding said castings successively along and on said track in spaced-apart relation with the weight of the castings supported by the track, an anvil member located in line with the track to receive the castings therefrom, and a power-operated impact member above said anvil member.

6. In an apparatus of the character described, a pair of stationary supporting rails for castings, means for sliding said castings successively along and on said rails in spaced apart relation with the weight of the castings entirely supported by the rails while being moved thereon, a pair of anvil members interposed in said rails to receive the castings therefrom, and a power-operated impact member above said anvil member.

7. In an apparatus of the character described, a pair of stationary supporting members upon which the castings are moved, means for sliding the castings on said members with the weight of the castings entirely supported by the members, a pair of anvils interposed in said members to receive the castings therefrom, and a power-operated impact member above said anvil, the upper faces of said anvils being slightly above said stationary supporting members together with inclined portions leading thereto from supporting members.

WILLIAM C. SPECK.
EUGENE BARKER.